United States Patent Office 3,309,375
Patented Mar. 14, 1967

3,309,375
2-CYCLOALKYL-1,3-DI(4-PYRIDYL)-2-PROPANOLS
Bernard Brust, Parsippany, Troy Hills, Rodney Ian Fryer, North Caldwell, and Leo Henryk Sternbach, Upper Montclair, N.J., assignors to Hoffmann-La Roche Inc., Nutley, N.J., a corporation of New Jersey
No Drawing. Filed June 21, 1965, Ser. No. 465,755
4 Claims. (Cl. 260—296)

This application is a continuation-in-part of application Serial No. 344,218, filed February 12, 1964, now abandoned.

This invention relates, in general, to novel therapeutically active compounds. More particularly, the invention relates to pharmacologically active pyridyl compounds and to a process for producing same.

The novel compounds of this invention have the structural formula as follows:

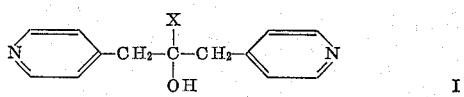

wherein X is a cycloalkyl group having from 3 to 8 carbon atoms.

Additionally, the invention embraces within its scope, salts of such compounds with medicinally acceptable acids, such as, hydrochloric acid, sulfuric acid, p-toluene sulfonic acid, etc.

The compounds of Formula I, and acid addition salts thereof, relieve or diminish tremors which are brought about in animals by Tremorine, i.e., 1,4-di-pyrrolidino-2-butyne with a minimum of peripheral antichlolinergic side effects. Additionally, they reduce hypothermia produced by Tremorine. Thus, the compounds are indicated for use in the study of the treatment of tremors which are characteristic of Parkinson's Disease. Furthermore, the compounds of this invention alter the activity of the liver microsomal drug metabolizing enzymes. For example, they inhibit the following enzymatic oxidative reactions: hexobarbital to ketohexobarbital, acetanilid to p-hydroxy-acetanilid, amphetamine to phenylacetone, dilantin to its p-hydroxy derivatives, etc. On prolonged administration the compounds of this invention stimulate the activity of the liver microsomal drug metabolizing enzymes. Because of their activity, these compounds provide a valuable tool for the study of the drug metabolizing enzyme systems associated with the liver microsomes and are useful in the study and treatment of diseases caused by metabolic failures of such enzyme systems, for example, in the treatment of phenylketonuria.

The compounds of this invention are readily prepared. A preferred process comprises the reaction of a picolyl metal compound having the formula:

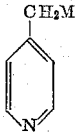

II in which the symbol M represents an alkali metal, such as, sodium, potassium, or lithium with a cycloalkyl carboxylic acid halide having from 4 to 9 carbon atoms. In carrying out the invention, there is used preferably a ratio of at least about 2.0 moles of the picolyl metal compound of Formula II for each mole of the cycloalkyl carboxylic acid chloride. Obviously, a larger or smaller quantity of the picolyl metal compound can be used, if desired.

Thus, in carrying out this invention, there can be used, as the Formula II starting material, 4-picolyl sodium, 4-picolyl potassium or 4-picolyl lithium. In the preferred embodiment of the invention, however, 4-picolyl lithium is used. As the cycloalkyl carboxylic acid halide, one can use, for example, cyclopropyl carboxylic acid halide, cyclobutyl carboxylic acid halide, cyclopentyl carboxylic acid halide, hexahydrobenzoyl halide, i.e. cyclohexyl carboxylic acid halide, cycloheptyl carboxylic acid halide and cyclooctyl carboxylic acid halide. The preferred compounds of this invention are obtained using hexahydrobenzoyl chloride.

Alternate processes are available for producing the compounds of this invention. Thus, for example, the compounds can be prepared by reacting a compound of Formula II with an ester of a cycloaliphatic acid. Esters which are suitable for use include alkyl esters of a cycloaliphatic acid, such as, the methyl, ethyl, butyl, etc. esters of cyclopropyl carboxylic acid, cyclobutyl carboxylic acid, cyclopentyl carboxylic acid, cyclohexyl carboxylic acid; phenyl esters of such cycloalkyl carboxylic acids; and benzyl esters of such cycloalkyl carboxylic acids.

In carrying out this invention, an organic solvent solution of the 4-picolyl metal compound is first prepared. In general, the invention embraces the use of any organic solvent in which the 4-picolyl metal compound is soluble and which, at the same time, is inert under the reaction conditions employed. Solvents which are suitable for use in this step of the process, include, for example, benzene, diethyl ether, toluene, 4-picoline, tetrahydrofuran, etc. In the preferred embodiment of the invention, however, the 4-picolyl metal compound is dissolved, for example, in tetrahydrofuran.

The organic solvent solution of the 4-picolyl metal compound, the production of which is described in the preceding paragraph, is cooled by appropriate means to a temperature below about room temperature. In the preferred embodiment of the invention, the solution is cooled to a temperature within the range of from about −10° to −60° C. To this cooled solution, there is added an organic solvent solution of the cycloalkyl carboxylic acid reactant, e.g., the cycloalkyl carboxylic acid halide. As the solvent for such reactant, one can use, for example, ethyl ether, n-butyl ether, dioxane, tetrahydrofuran, etc., either alone or in admixture with some other organic solvent which is inert under the reaction conditions employed. The reaction mixture is stirred at a temperature within the range of from about −10° to −60° C. for an extended period of time, for example, up to about sixty minutes, following which it is stirred at room temperature. Generally, the step of stirring the reaction mixture at room temperature is carried out over a period of about two hours. When the reaction is completed, the reaction mixture is worked up to isolate the compound produced. In one such method, the reaction mixture is diluted with water and, subsequently, acidified using some suitable acid. In general, any organic acid can be used in this step of the process. These include, for example, nitric acid, phosphoric acid, sulfuric acid, etc. In the preferred embodiment of the invention, however, the acidification is effected by the addition of hydrochloric acid to the reaction mixture.

Subsequently, the two layers comprising the two-phase system are separated and the organic phase is extracted with an inorganic acid. While hydrochloric acid is preferably employed as the extracting acid, other such acids can be used. These include, for example, sulfuric acid, nitric acid, phosphoric acid. The acid extracts are combined, washed with a suitable solvent, for example, toluene, ether, etc., and made alkaline by treatment with a suitable alkali. While sodium hydroxide is used in the preferred embodiment of the invention, other organic or inorganic bases, such as potassium hydroxide, ammonium hydroxide, etc., can instead be employed. Treatment of the acid extracts with alkali results in the precipitation of the desired compound. The precipitated compound can be purified, for example, by washing with appropriate solvents, such as, water, ether, etc., and subsequent recrystallization. The compound can, thereafter, be converted into its acid additional salt, if desired, by appropriate means.

As indicated heretofore, the compounds of this invention are useful inter alia, in the study and treatment of diseases caused by metabolic failures of enzyme systems. The manner in which they are used for such purpose will be readily apparent to persons skilled in the art. It can be mentioned, however, that, in general, the compounds can be formulated, with conventional inert adjuvants, into dosage forms suitable for oral or parenteral administration. The frequency of administration is variable, depending upon the needs and requirements of the patient.

For a fuller understanding of the nature and objects of this invention, reference may be had to the following example which is given as a further illustration of the invention and is not to be construed in a limiting sense.

*Example 1*

In this example, a solution of 23.9 grams (0.2 mole) of hexahydrobenzoyl chloride in 75 ml. of anhydrous tetrahydrofuran was added slowly over a period of about 30 minutes to a 0.5 molar solution of 4-picolyl lithium. During such addition, the latter solution was maintained at a temperature of —20° C. When the addition was completed, the reaction mixture was stirred at a temperature of —20° C. for a period of about thirty minutes, following which it was stirred at room temperature for a period of about two hours. At the end of that period of time, 1.0 liter of water was added to the reaction mixture. The resulting solution was acidified using 3 N hydrochloric acid. A two-layer system was formed. These layers were separated and the organic base was extracted two times using 200 ml. of hydrochloric acid each time. The acid extracts were combined, washed three times using 200 ml. of ether each time, and made alkaline with 10.0 N sodium hydroxide solution. The alkaline solution was allowed to stand at room temperature overnight and as a result thereof a precipitate formed. The precipitate was removed by filtration, washed, first, five times using 100 ml. of water each time, and thereafter, three times using 100 ml. of ether each time. The precipitate was recrystallized from an acetone-hexane mixture to yield 2-cyclohexyl-1,3-di(4-pyridyl)-2-propanol, as colorless prisms, melting at 176° to 178° C.

*Example 2*

In this example, 0.2 mole of cyclopropane carboxylic acid chloride dissolved in 150 ml. of tetrahydrofuran was added, drop by drop, over a period of about sixty minutes to a stirred solution of 0.5 mole of 4-picolyl lithium. This addition was carried out in an atmosphere of dry nitrogen, with the 4-picolyl lithium solution being cooled to a temperature of —30° to —50° C. in a bath of Dry Ice-acetone. After about three hours, the reaction mixture was treated with 100 ml. of water and was then extracted three times, using 150 ml. portions of 6 N hydrochloric acid, each time. The acid extracts were combined and washed three times, using 150 ml. portions of ether each time. The product was liberated by stirring the mixture into a mixture of 500 grams of ice and 300 ml. of concentrated ammonium hydroxide. Ice was added to the mixture, as needed, to maintain a temperature of the mixture at about 0° C.

The mixture, obtained as described in the proceeding paragraph, was filtered to obtain 2-cyclopropyl-1,3-di(4-pyridyl)-2-propanol, melting at 133° C. to 141° C. Recrystallization of this product from an ethanol-water mixture yielded 2-cyclopropyl-1,3-di(4-pyridyl)-2-propanol, in the form of colorless prisms, melting at 141° C. to 143° C. The compound, melting at 144° C. to 145° C., was obtained by recrystallization from acetone.

*Example 3*

In this example, 0.2 mole of cycloheptane carboxylic acid chloride dissolved in 150 ml. of tetrahydrofuran was added, in dropwise fashion over a period of about sixty minutes, to a stirred solution of 0.5 mole of 4-picolyl lithium. This addition was carried out under an atmosphere of dry nitrogen with the 4-picolyl lithium solution being cooled to a temperature of —30° to —50° C. in a bath of Dry Ice-acetone. After three hours, the reaction mixture was treated with 100 ml. of water, following which it was extracted three times, using 150 ml. portions of 6 N hydrochloric acid each time. The acid extracts were then washed three times, using 150 ml. portions of ether each time. The product was liberated by stirring the reaction mixture into a mixture of 500 grams of ice and 300 ml. of concentrated ammonium hydroxide. Ice was added, as needed, to maintain the temperature at about 0° C.

The basic solution obtained as described in the preceeding paragraph, was extracted with methylene chloride, dried over magnesium sulfate and it was concentrated, in vacuo, to provide an oil. The oil was treated with 500 ml. of heated hexane and, upon cooling, colorless 2-cycloheptyl-1,3-di(4-pyridyl)-2-propanol crystallized. This compound, which melted at 145° C. to 148° C., was recovered by filtration. The product was crystallized three times from acetone to yield 2-cycloheptyl-1,3-di(4-pyridyl)-2-propanol in the form of colorless prisms, melting at 151° C. to 153° C.

*Example 4*

This example is included herein to demonstrate the preparation of dosage forms containing as the active ingredient a representative compound of this invention.

(a) Capsule Formulation: 10 mg. of 2-cyclohexyl-1,3-di(4-pyridyl)-2-propanol were mixed with 165 mg. of lactose, U.S.P. and 30 mg. of corn starch, U.S.P. The mixture was then blended by passing through a Fitzpatrick Comminuting Machine with a No. 1A screen with knives forward. The blended powder was, thereafter, returned to the mixer and 5 mg. of talc was added thereto and blended therewith. The product was subsequently filled into hard shell gelatin capsules.

(b) Tablet Formulation: 5.10 mg. of 2-cyclohexyl-1,3-di(4-pyridyl)-2-propanol were mixed with 84.40 mg. of lactose, U.S.P., 10.0 mg. of corn starch and 0.5 mg. of magnesium stearate. The mixture was blended by passing through a Fitzpatrick Comminuting Machine, fitted with a No. 1A screen with knives forward. The powder was then slugged on a tablet compressing machine following which the slugs were comminuted using a No. 16 screen. The mixture was compressed at a tablet weight of 100 mg. using tablet punches having a diameter of approximately ¼ inch.

(c) Parenteral Formulation: 25 mg. of 2-cyclohexyl-1,3-di(4-pyridyl)-2-propanol were slurried in a small amount of water. To the slurry there was added slowly 1 N hydrochloric acid to pH of 3.0. The solution was filtered and allowed to stand for twenty-four hours. Thereafter, the filtrate was filtered through a 02 Selas candle. The filtrate was then filled into ampules under an atmosphere of nitrogen, which were then sealed. The ampuls phere of nitrogen, which were then sealed. The ampules were sterilized for twenty minutes at a temperature of 250° F.

What is claimed is:

1. A compound selected from the group consisting of a member having the formula:

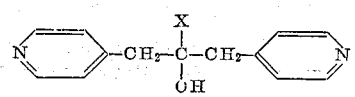

in which X is a cycloalkyl group having from 3 to 8 carbon atoms and salts of such compounds with medicinally acceptable acids.

2. 2-cyclohexyl-1,3-di(4-pyridyl)-2-propanol.
3. 2-cyclopropyl-1,3-di(4-pyridyl)-2-propanol.
4. 2-cycloheptyl-1,3-di(4-pyridyl)-2-propanol.

References Cited by the Examiner
UNITED STATES PATENTS
2,727,899  12/1955  Bernstein _____ 260—297

WALTER A. MODANCE, *Primary Examiner.*
ALAN L. ROTMAN, *Assistant Examiner.*